H. T. WHALER.
SPLICE FOR LEAD ARMORED CABLES.
APPLICATION FILED NOV. 15, 1913.
1,142,213.
Patented June 8, 1915.
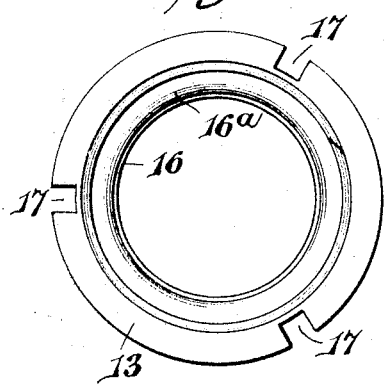
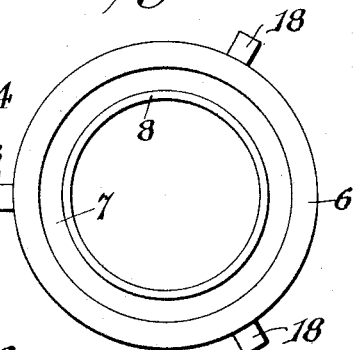
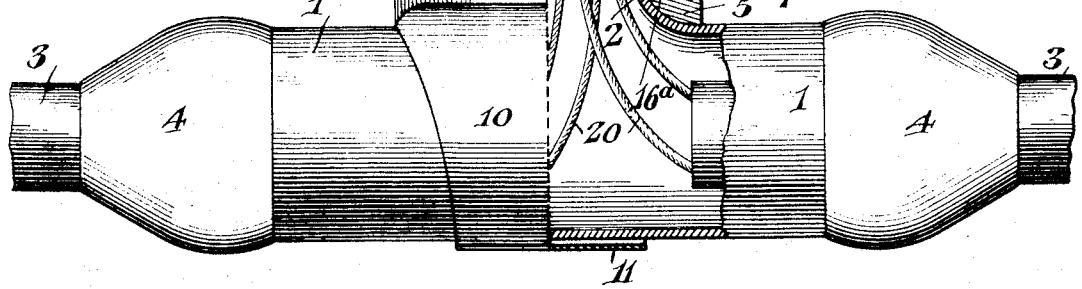
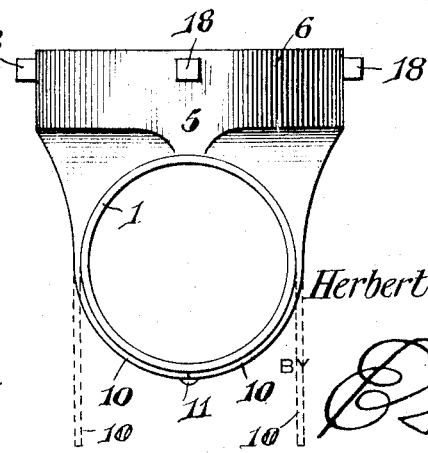
Herbert Thompson Whaler,
INVENTOR
WITNESSES
ATTORNEY

UNITED STATES PATENT OFFICE.

HERBERT THOMPSON WHALER, OF MIAMI, FLORIDA.

SPLICE FOR LEAD-ARMORED CABLES.

1,142,213. Specification of Letters Patent. Patented June 8, 1915.

Application filed November 15, 1913. Serial No. 801,210.

*To all whom it may concern:*

Be it known that I, HERBERT T. WHALER, a subject of the King of Great Britain, residing at Miami, in the county of Dade and State of Florida, have invented a new and useful Splice for Lead-Armored Cables, of which the following is a specification.

This invention relates to improvements in splices for lead armored cables of electric conductors, and its object is to provide a cable joint to which the ends of the cable may be secured in alined relation by the employment of ordinary wiped joints at their entrances, while the conductors are readily joined and are at all times accessible without molesting the wiper joints or injuring the splice or cable in any way.

In accordance with the present invention there is provided a splice or joint member usually of lead to which the corresponding ends of the cable sections may be connected by wiped joints and at an intermediate joint the splice is formed with a neck to which is applied a hard metal, say, a brass collar, having strap extensions in embracing relation to the portion of the splice remote from the neck and collar, and the collar is so arranged as to receive an elongated cap constituting a receptacle for the connected ends of the conductors or strands of the cable.

The invention will be best understood from a consideration of the following detailed description, taken in connection with the accompanying drawings forming a part of this specification, with the further understanding that while the drawings show a practical embodiment of the invention, the latter is not confined to any strict conformity with the showing of the drawings, but may be changed and modified so long as such changes and modifications mark no material departure from the salient features of the invention.

In the drawings:—Figure 1 is a view partly in elevation and partly in section showing the improved cable splice. Fig. 2 is an end view of the cable splice with the cable and cap member or receptacle omitted. Fig. 3 is a bottom end view of the cap member or receptacle. Fig. 4 is a top end view of the collar for surrounding the intermediate neck of the cable splice.

Referring to the drawings, there is shown a splice having a body member 1 which may be of appropriate length and of generally cylindrical form and at an intermediate point this body member 1 is formed with a neck 2 outstanding laterally therefrom.

In Fig. 1 there is shown the ends of cable sections 3 which as is customary are made up of a bundle of insulated conductors about which there is a sheath, and it is the purpose of the splice 1 to connect the adjacent ends of cable members 3 so that a practically continuous cable of any suitable length may be produced from cables the lengths of which are limited by the exigencies of manufacture.

In order to unite the ends of the cable sections 3 they are introduced into the corresponding ends of the body member 1, which latter may be then condensed about the cable ends and united to the sheaths thereof by wiped joints 4, the body member 1 of the splice being of lead like the sheaths of the cable sections 3.

Applied about the neck 2 is a collar 5 usually of brass or some other suitable hard metal, and this collar has an axial extension 6 internally screw threaded and interior to the screw threaded portion the collar is formed with a circumferential groove 7 bordered on the inside by an upstanding flange 8, that is, the flange is substantially concentric with the axially extended portion 6. The groove 7 is designed to receive a packing ring or gasket 9.

Formed on or secured to the collar 5 are straps 10 together of a length to embrace the body member 1, so that their ends come together where they may be soldered as indicated at 11, thus strengthening the union between the collar 5 and the body member 1.

Adapted to the threaded extension 6 of the collar 5 is an exteriorly threaded ring 12 provided at one end with an outstanding flange 13, and this ring is of a size to fit into the collar 5 with the screw threads in engagement. The ring 12 is applied exteriorly to an elongated tubular receptacle 14 having the end remote from the ring closed, as indicated at 15, while the other end is turned over the corresponding end of the ring 12, as indicated at 16ª, the ring being soldered to the receptacle 14 or otherwise secured thereto, so that there is a strong union produced, and the ring 12 becomes effectively part of the receptacle 14, both the ring and receptacle being made of some such material as brass, but not of necessity limited to brass. The interior of the receptacle 14 is provided with a lining 16 of insulating material.

The flange 13 may be conveniently provided with notches 17 for the application of a spanner or other tool, whereby the ring with the receptacle 14 may be screwed into the neck 5 and in order to avoid strain upon the body member 1 the neck 5 may be conveniently provided with outstanding pins 18 appropriately distributed for the application of a suitable tool.

When the ring 12 is screwed into the collar 5 it ultimately engages the washer 9, thus producing an air tight joint, while the washer is prevented from spreading by reason of the flange 8, which latter also serves as a shoulder for the corresponding end of the neck 2.

The cables 3 may consist of a large number of electric conductors 19, each appropriately insulated, as indicated at 20. The sheathing at the ends of the cable is so cut off as to expose appropriate lengths of the ends of the conductors 19 with other insulating covering 20, which latter, as is customary, is removed from the extreme ends of the conductors, so that appropriate conductors of one cable may be joined to appropriate conductors of the other cable, as indicated in Fig. 1, and the joined parts are carried beyond the neck 2 and when the cap or receptacle 14 is screwed into place become housed therein, and these joined ends of the conductors properly protected from contact as by taping or otherwise, are relieved from all strain and may, moreover, be readily accessible at all times for inspection, since it is only necessary to unscrew the cap 14 to expose all of the conductors to view.

The splice with the receptacle 14 forms an air tight junction thus thoroughly protecting the ends of the conductors where joined, without the necessity of embedding the conductors in insulating material to thus make it difficult to reach them. With the present invention inspection and testing is greatly facilitated, and changes may be made in the connections, the opening and closing of the splice after once installed requiring merely a pair of special spanners with the particular arrangement shown, but even this may be avoided by any other tool receiving construction which may be desired.

By having the cable ends to be joined enter the armor of the splice in line one with the other and using wiped joints to connect the armor of the splice to the armor of the cable, such splice will stand as much tensile strain and vibration as other parts of the cable sheath.

The cable splice of the present invention is particularly valuable in cases where a submarine cable is joined to an aerial on bridges, for in such instances the joint is subjected to almost constant vibration due to traffic on the bridge.

The cable joint of the present invention is of such a simple nature that the cable splicer does not have to learn to make new and difficult joints as occurs with other types in use.

In making up a splice there is no danger of getting it wet by rain, since the ends of the cable need not be unsealed until after the joints are wiped, and then should it transpire that rain occurs after the armor has been stripped off the ends of the cable, all that is necessary is to screw the receptacle into place and the splice is perfectly protected against the effects of the rain.

What is claimed is:—

1. A splice for lead armored cables, comprising a body member of soft metal having an intermediate side neck integral therewith, and a separately formed collar surrounding the neck and provided with means embracing the body member opposite the neck to hold the collar to the body member independently of the neck.

2. A splice for lead armored cables, comprising an elongated continuous body member of soft metal with the ends adapted to receive and be united by wiped joints to the ends of the cable, said body member having an intermediate laterally projecting neck integral therewith, a separately formed collar secured to the body member and encircling the neck and provided with interior screw threads and with a gasket-receiving groove at the base of the screw threads, and an elongated cap member adapted to the collar to engage a gasket seated in the gasket-receiving groove.

3. A splice for lead armored cables comprising an elongated soft metal body member having the ends adapted to receive and be united to the ends of the cable, said body member having an intermediate laterally projecting neck integral therewith, a separately formed collar applied to the neck and provided with interior screw threads and with a gasket receiving groove at the base of the screw threads, and an elongated cap member having an open end provided with a threaded ring adapted to the threaded portion of the collar and to engage a gasket seated in the gasket receiving groove, that portion of the collar interior to the groove being formed into a flange immediately engaging the neck of the body member and constituting an abutment for a gasket seated in the groove to prevent spreading of said gasket.

4. In a splice for lead armored cables, an elongated soft metal body member shaped at the ends to receive corresponding ends of the cable and to be united thereto, and said body member having an intermediate side neck integral therewith, and a separately formed cap-receiving collar surrounding the neck and provided with straps for embracing the body member to hold the collar in surrounding relation to the side neck.

5. A splice for lead armored cable comprising an elongated body member of like material to the cable armor and shaped at the ends to receive corresponding ends of the cable, and said body member having an intermediate side neck integral therewith, a separately formed collar surrounding the neck and provided with straps adapted to embrace the body member, and a cap member adapted to the collar for closing the side neck of the splice, the cap member and collar being provided with means for the application of a tool.

6. A splice for lead armored cable comprising an elongated body member having an integral side neck, and composed of a relatively soft and pliable metal, a separately formed collar surrounding the neck and provided with straps for embracing the body member, said collar and straps being formed of a relatively hard and rigid metal and an elongated cap member adapted to the collar, said cap member and collar being coactively constructed to permit the cap member to be applied to and removed from the collar, at will.

7. A splice for lead armored cable comprising an elongated body member of relatively soft metal adapted to receive the ends of cables to be joined and said body member having an intermediate side neck, a separately formed reinforcing collar of relatively hard metal secured to the body member about the side neck, and an elongated cap member having means for its attachment to the collar, independent of the neck.

8. A splice for lead armored cables comprising an elongated body member shaped at the ends to receive corresponding ends of the cable and to be secured thereto, and at an intermediate point provided with a laterally extended neck, a separately formed collar applied to the neck and provided with straps adapted to encircle the body member between its ends, said collar being internally screw threaded and having at the base of the screw threads a gasket receiving groove with an interior flange forming one wall of the groove, and a cap member closed at one end and at the other end surrounded by a ring fast thereto and provided with exterior screw threads adapted to the interior screw threads of the collar, the cap member having an interior lining of insulating material.

9. A splice for lead armored cables comprising an elongated body member shaped at the ends to receive corresponding ends of the cable and to be secured thereto, and at an intermediate point provided with a laterally extended neck, a separately formed collar applied to the neck and provided with straps adapted to encircle the body member between its ends, said collar being internally screw threaded and having at the base of the screw threads a gasket receiving groove with an interior flange forming one wall of the groove, and a cap member closed at one end and at the other end surrounded by a ring fast thereto and provided with exterior screw threads adapted to the interior screw threads of the collar, the cap member having an interior lining of insulating material, and both the collar and the ring of the cap member being shaped for the application of manipulating tools.

In testimony, that I claim the foregoing as my own, I have hereto affixed my signature in the presence of two witnesses.

HERBERT THOMPSON WHALER.

Witnesses:
ROGER N. DANIELS,
CHAS. MILLS TERRELL.